United States Patent
Krebs et al.

(10) Patent No.: US 6,472,083 B1
(45) Date of Patent: *Oct. 29, 2002

(54) METAL SURFACED HIGH PRESSURE LAMINATE

(75) Inventors: Robert R. Krebs, Georgetown, TX (US); Ernest L. Phelps, Waco, TX (US); Genevieve L. Tepera, Rogers, TX (US)

(73) Assignee: Premark RWP Holdings, Inc., Wilmington, DE (US)

( * ) Notice: Subject to any disclaimer, the term of this patent is extended or adjusted under 35 U.S.C. 154(b) by 35 days.

This patent is subject to a terminal disclaimer.

(21) Appl. No.: 09/639,852

(22) Filed: Aug. 16, 2000

(51) Int. Cl.$^7$ .......................... B32B 15/08; B32B 27/04
(52) U.S. Cl. .................. 428/460; 428/461; 428/463; 428/464; 156/307.3; 156/307.4; 156/307.7
(58) Field of Search ................. 428/460, 464, 428/463, 461, 900; 156/275.5, 307.3, 307.4, 307.7

(56) References Cited

U.S. PATENT DOCUMENTS

| | | | |
|---|---|---|---|
| 3,654,711 A | 4/1972 | Taylor | 35/66 |
| 3,884,771 A | 5/1975 | Hanabusa et al. | 204/12 |
| 3,889,736 A | 6/1975 | Firks | 160/135 |
| 3,936,575 A | 2/1976 | Tsutomu et al. | |
| 4,364,731 A | 12/1982 | Norling et al. | 433/218 |
| 4,578,308 A | 3/1986 | Hani et al. | 428/297 |
| 4,584,223 A | 4/1986 | Krapf | 428/58 |
| 4,678,707 A | 7/1987 | Shinozaki et al. | 428/323 |
| 4,888,247 A | 12/1989 | Zweben et al. | 428/195 |
| 4,935,281 A * | 6/1990 | Tolbert et al. | 428/116 |
| 5,089,348 A | 2/1992 | Louderback | 428/464 |
| 5,200,853 A * | 4/1993 | Berkman | 359/443 |
| 5,361,164 A | 11/1994 | Steliga | 359/455 |
| 5,478,414 A | 12/1995 | Mozelewski et al. | |
| 5,480,505 A | 1/1996 | Andre | 156/201 |
| 5,814,395 A | 9/1998 | Soellaart-Roelofsen | 428/213 |
| 5,941,713 A | 8/1999 | Wayner et al. | 434/414 |
| 5,955,203 A | 9/1999 | Briggs et al. | 428/460 |
| 5,989,668 A * | 11/1999 | Nelson et al. | 428/50 |
| 6,068,041 A | 5/2000 | Miles et al. | 160/135 |
| 6,165,309 A * | 12/2000 | Burnell et al. | 156/308.2 |
| 6,171,705 B1 * | 1/2001 | Clifford | 428/464 |
| 6,248,401 B1 * | 6/2001 | Chiang et al. | 427/255.7 |

FOREIGN PATENT DOCUMENTS

| | | | |
|---|---|---|---|
| DE | 2025675 | | 9/1971 |
| DE | 261702 A | * | 11/1988 |
| EP | 31701 | | 7/1981 |
| EP | 0184760 A2 | | 6/1986 |
| EP | 301720 | | 2/1989 |
| EP | 390999 A1 | | 10/1990 |
| EP | 472822 | | 3/1992 |
| EP | 708222 B1 | | 4/1996 |
| EP | 0934977 A1 | | 8/1999 |
| EP | 0993942 A1 | | 4/2000 |
| FR | 2443121 | | 6/1980 |
| GB | 2315367 A | | 1/1998 |
| JP | 60025747 A | | 2/1985 |
| JP | 6201897 | | 1/1987 |
| JP | 63286933 | | 5/1987 |
| JP | 11-058601 | * | 3/1999 |

* cited by examiner

Primary Examiner—Paul Thibodeau
Assistant Examiner—Monique R. Jackson
(74) Attorney, Agent, or Firm—Welsh & Flaxman LLC

(57) ABSTRACT

The invention relates to the bonding of a phenolic resin impregnated core and a metal sheet into a high pressure laminate. A binding layer of a styrene-maleic anhydride copolymer is positioned between the core and the metal sheet to ensure bonding of the layers when a lay-up containing the desired layers is heated and pressed.

2 Claims, 1 Drawing Sheet

METAL SURFACED HIGH PRESSURE LAMINATE

BACKGROUND OF THE INVENTION

1. Field of the Invention

The present invention relates to metal surfaced decorative laminates. More particularly, the invention relates to the bonding of a phenolic resin impregnated core and a metal sheet into a high pressure laminate.

2. Description of the Prior Art

Decorative laminates have found wide acceptance within the furniture and building industries. The durability, cost and versatility of decorative laminates make them useful in almost any structural application. For example, decorative laminates are found in everything from flooring products to furniture to countertops.

The laminate industry is continually striving to improve the functionality of decorative laminates. Whether the improvement relates to a locking tongue and groove configuration for decorative laminate flooring panels or improved surface characteristics for a countertop, furniture, store fixtures, signage, column wraps, appliance fronts, push and kick plates, ceiling panels, residential cabinetry, wall panels, decorative trim and accents or restaurant/food service equipment, the advances in decorative laminate manufacturing make these materials equal to, or better than, the materials they are designed to replace.

With this in mind, metal surfaced laminates are currently manufactured by securing a metal sheet to a phenolic high pressure core with double sided tape or conventional adhesives. In addition to the simple fact that the additional steps (and therefore time) are required after the steps of pressing and heating the laminate lay-up, the process of applying the double sided tape is cumbersome and difficult in and of itself. As a result, the metal surfaced laminates are substantially more expensive than conventional laminates.

In addition, while the use of double sided tape offers stability in the resulting metal surfaced laminate, the bond between the metal sheet and the core is susceptible to release under certain circumstances. For example, it has been found that the double sided tape gives when the metal surfaced laminate is cut into strips for use in the fabrication of a front edge on worktops. In addition, it has been found that the adhesive bond will give when formed into a radius and upon the application of heat during post formation bending.

A need, therefore, exists for a metal surfaced laminate constructed in a manner permitting convenient assembly and enhanced bonding between the metal sheet and the resin impregnated sheets making up the remainder of the laminate. The present invention provides such a construction material.

SUMMARY OF THE INVENTION

It is, therefore, an object of the present invention to provide a laminate including a metal layer, a binding layer and a polymer layer.

It is also an object of the present invention to provide a method for manufacturing a metal surface decorative laminate. The method is achieved by first assembling a laminate lay-up composed of a metal layer, a binding layer and a polymer layer. The laminate lay-up is then heated and pressed.

It is a further object of the present invention to provide a metal surfaced decorative laminate manufactured in accordance with the method outlined above.

Other objects and advantages of the present invention will become apparent from the following detailed description when viewed in conjunction with the accompanying drawings, which set forth certain embodiments of the invention.

DESCRIPTION OF THE PREFERRED EMBODIMENTS

Figure 1:
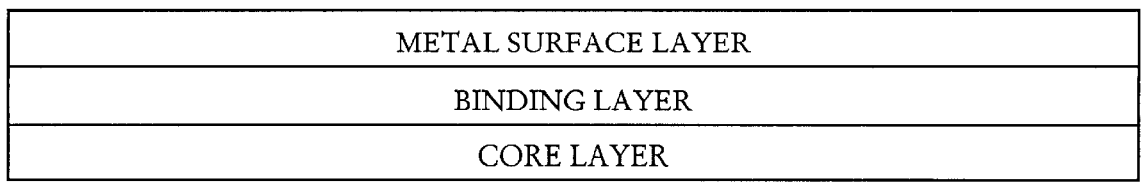
FIG. 1 is a schematic of a metal surfaced laminate manufactured in accordance with the present invention.

The detailed embodiments of the present invention are disclosed herein. It should be understood, however, that the disclosed embodiments are merely exemplary of the invention, which may be embodied in various forms. Therefore, the details disclosed herein are not to be interpreted as limited, but merely as the basis for the claims and as a basis for teaching one skilled in the art how to make and/or use the invention.

Referring to FIG. 1, a decorative laminate 10 in accordance with the present invention is disclosed. The decorative laminate 10 includes an exterior metal surface layer 12, a binding layer 14, and a core layer 16. While a specific layering pattern is disclosed in accordance with a preferred embodiment of the present invention, the layering pattern may be varied, somewhat, without departing from the spirit of the present invention.

The metal surface layer 12 may be chosen from a variety of metal sheets currently used in the manufacture of metal surfaced laminates. For example, the metal surface layer may be chosen from the group consisting of copper, brass, bronze, stainless steel and galvanized steel. While preferred metals are disclosed above, those skilled in the art will appreciate the wide variety of metals which may be used in accordance with the present invention. For example, it is contemplated that aluminum and anodized aluminum may be used in accordance with the present invention.

The exact thickness of the metal sheets used in accordance with the present invention may be varied to suit specific functions and cost constraints. The sheets are preferably of a thickness which may be processed using conventional laminate pressing equipment. With this in mind, it is contemplated that the sheets will be approximately 0.018 cm and 0.076 cm in thickness.

The binding layer 14 is preferably composed of DILARK®, a styrene-maleic anhydride copolymer manufactured by NOVA Chemicals, Inc. More preferably, the binding layer 14 is composed of DILARK® 481. DILARK® exhibits outstanding bonding characteristics with the phenolic resin impregnated kraft paper making up the core layer 16 discussed below in greater detail. DILARK® also exhibits outstanding bonding characteristics with the metal surface layer 12.

With regard to DILARK® 's bonding with the phenolic resin impregnated kraft paper, the excellent bonding characteristics are a result of the carboxyl groups found on the maleic anhydride of the DILARK® copolymer. The carboxyl groups bind with the phenolic resin to produce a very stable laminate. Although DILARK® is disclosed as a preferred binding layer material in accordance with the present invention, other functionally and structurally equivalent polymers may be used without departing from the spirit of the present invention.

With regard to DILARK® 's bonding with the metal surface layer 12, the excellent bonding characteristics may be a result of DYLARK@'s ability to bond with an oxide layer of the metal (see U.S. Pat. No. 4,364,731) or mechanical bonding to microscopic irregularities in the metal surface (see U.S. Pat. No. 5,478,414) or both.

The core layer 16 is preferably composed of multiple layers of phenolic resin impregnated sheets, although other materials may be used without departing from the spirit of the present invention. Those skilled in the art will appreciate the considerations evaluated in determining the appropriate number of sheets to use in forming the core of a high pressure decorative laminate. In accordance with a preferred embodiment of the present invention, the core is formed of three sheets of phenolic resin impregnated sheets. Specifically, and in accordance with a preferred embodiment of the present invention sheets of the core layer 16 include 120–323 grams per square meter dry phenolic resin impregnated kraft paper. The kraft paper is impregnated throughout and bonded with a substantially completely cured phenolic resin which has been converted to a thermoset state during the initial laminating step.

In accordance with the present invention, the metal surfaced high pressure decorative laminate 10 of the present invention is formed in much the same manner as conventional decorative laminates. The layers are first stacked and placed between steel plates. The laminate stack is then subjected to temperatures in the range of approximately 143° C. to 154° C., preferably 149° C., and approximately 70.3 kg/cm$^2$ for a time sufficient to consolidate the laminate and cure the resins (generally about 20–30 minutes). The temperature range presented above is determined based upon the fact that the DILARK® will not satisfactorily bond to the metal at temperature below those listed.

The pressure and heat force the resin in the paper sheets to flow, cure and consolidate the sheets into a unitary laminated mass referred to in the art as a decorative high pressure laminate. Generally, more than one laminate is formed at one time. Multiple laminates are formed by inserting a plurality of assembled sheets in a stack. Release sheets are positioned between the assembled sheets to separate the various laminates stacked together. After consolidation, the release sheets allow the individual laminates to be separated.

The following chart discloses the bond strength in laminates formed in accordance with the present invention (specifically, the data below relates to testing of a laminate composed of core paper/Dylark®/metal/Dylark®/core paper):

| METAL | LOAD kg/cm$^2$ | STRESS kg/cm$^2$ |
|---|---|---|
| Copper | 790.45 | 197.61 |
| Brass | 790.45 | 195.5 |
| Bronze | 790.59 | 197.61 |
| Stainless Steel | 790.52 | 197.61 |
| Galvanized Steel | 790.66 | 197.68 |

Once formed, the decorative laminate 10 may be used in the construction of a variety of structures from which decorative laminates are commonly manufactured. Similarly, it is contemplated that the improved bond strengths exhibited by decorative laminates manufactured in accordance with present invention make the present metal surface decorative laminate appropriate for previously unknown applications.

While various preferred embodiments have been shown and described, it will be understood that there is no intent to limit the invention by such disclosure, but rather, it is intended to cover all modifications and alternate constructions falling within the spirit and scope of the invention as defined in the appended claims.

What is claimed is:

1. A laminate, comprising:
   a metal surface layer;
   a polymer layer composed of phenolic resin impregnated kraft paper; and
   a binding layer composed of a copolymer consisting of styrene and maleic anhydride positioned between the polymer layer and the metal surface layer.

2. The laminate according to claim 1, wherein the metal surface layer is chosen from the group consisting of copper, brass, bronze, stainless steel, galvanized steel, aluminum and anodized aluminum.

* * * * *